March 16, 1948.  F. W. MERSTICK  2,437,885
MOTOR VEHICLE REFRIGERATOR
Filed Dec. 9, 1946  2 Sheets-Sheet 1
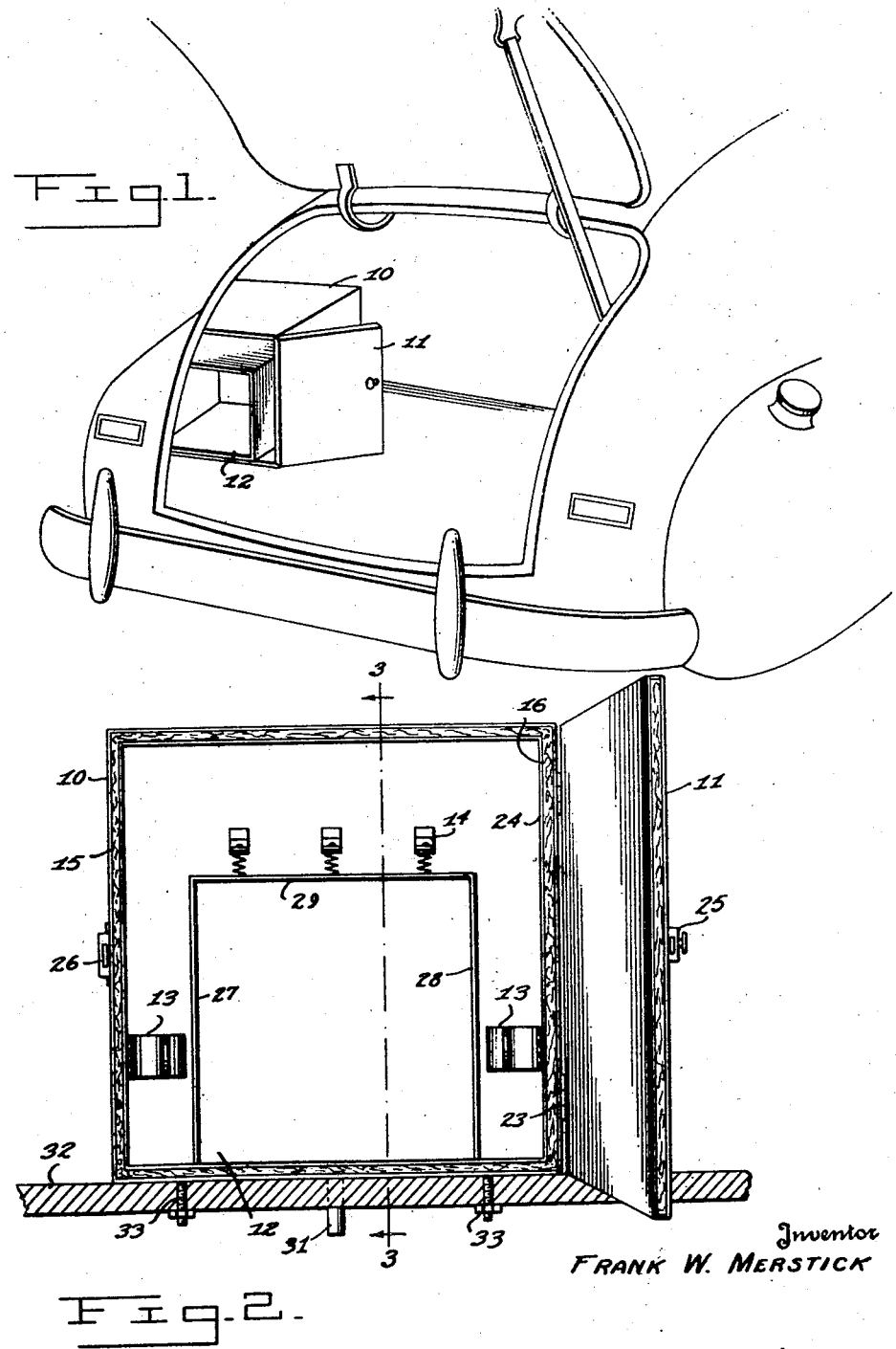
Inventor
FRANK W. MERSTICK March 16, 1948. F. W. MERSTICK 2,437,885
MOTOR VEHICLE REFRIGERATOR
Filed Dec. 9, 1946 2 Sheets-Sheet 2

Inventor
FRANK. W. MERSTICK

Patented Mar. 16, 1948

2,437,885

UNITED STATES PATENT OFFICE 2,437,885

MOTOR VEHICLE REFRIGERATOR

Frank W. Merstick, Cleveland, Ohio

Application December 9, 1946, Serial No. 715,025

3 Claims. (Cl. 62—31)

This invention relates to cooling devices for motor vehicles and in particular an ice box or refrigerator incorporated in the trunk or other part of the vehicle in which products such as food and beverages may be carried and removed and used as desired.

Various types of thermos bottles and jugs, and different styles of ice boxes and refrigerators have been used for carrying products in motor vehicles but the bottles and jugs are only adapted for holding liquid products, while the ice boxes have no adequate provision for the discharge of water resulting from the melting of the ice; and with these thoughts in mind the invention contemplates a unique insulated box incorporated in the vehicle with a drain extending through the floor, a separated ice compartment, and resilient clamps and clips for holding bottles and various articles.

The purpose of this invention is, therefore, to provide a simple and unique refrigerating element adapted for use in motor vehicles in which products in various types of containers may be carried wherein the products are separated from the ice or refrigerating medium and resiliently held in place to prevent rattling and breaking.

Because it is not practical to operate refrigerating systems from the battery or generator of a motor vehicle it is necessary to use ice and similar products, such as dry ice, as the cooling agent, and to be efficient the water should be drained off as the ice melts. To accomplish this end this invention contemplates a separate ice compartment with a drain for carrying the water through the floor of the vehicle as the ice melts.

The object of the invention is to provide a small compact refrigerator having an insulated wall and door, a centrally disposed ice compartment, and suitable clips and clamps for maintaining various types of products in their respective positions therein.

Another object of the invention is to provide a small compact refrigerator adapted to be installed in a trunk compartment of a motor vehicle.

Another object of the invention is to provide resilient holding devices adapted to maintain products in containers of different shapes in spaced relation in a motor vehicle while the vehicle is in operation.

A further object of the invention is to provide a simple compact refrigerator for use in motor vehicles which is of a simple and economical construction.

With these and other objects in view the invention embodies a box-like casing with insulated side, end, top and bottom walls, an insulated door, an ice compartment with perforated walls extending from the front to the back and spaced from the sides of the casing, product retaining clamps in the area above the ice box, and spring clips in the areas at the sides of ice box for holding bottles and the like in spaced relation. The casing is also provided with holes by which it may be attached by screws to the floor of the vehicle, and a drain from the ice compartment.

Other features and advantages of the invention will appear from the following description taken in connection with the drawings, wherein:

Figure 1 is a view showing the refrigerator installed in a trunk of a motor vehicle with the door of the refrigerator open.

Figure 2 is a view showing a front elevation of the refrigerator with the door in the open position and showing a portion of a floor of a vehicle in which the device is installed in section.

Figure 3:
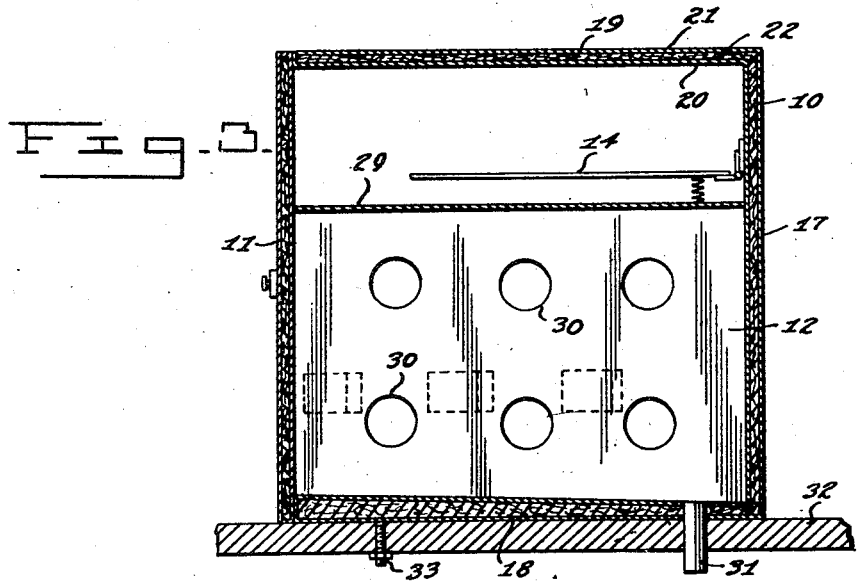
Figure 3 is a longitudinal section through the refrigerator on line 3—3 of Figure 2.

Referring now to the drawings wherein like reference characters indicate corresponding parts the refrigerator of this invention includes a box-like casing 10, having a door 11, an ice compartment 12, product holding clips 13 at the sides for bottles and the like, and spring clamps 14 in the area above the ice compartment for holding products in containers.

The casing 10 is formed with side walls 15 and 16, an end or rear wall 17, a base 18, and a top 19. The walls and also the door 11 are formed with an inner plate 20, an outer plate 21, and an insulating filling material 22 as shown in Figure 3. The door is attached to one of the sides by hinges 23 and 24 and the open edge is provided with a latch 25 adapted to hold the door in sealed relation with the front of the casing when engaged with a socket 26 on the casing.

The ice compartment 12 is also in the form of a box-like casing with side walls 27 and 28, and a cover 29, and the walls 27 and 28 are provided with perforations 30 through which the cold air may circulate around and through the products in the refrigerator. In the lower part of the ice compartment is a tube 31 extending from the compartment through a floor 32 of the vehicle, as shown in Figure 2, to form a drain. The refrigerator may also be provided with openings in the lower surface through which bolts 33 may be placed to secure the casing to the floor 32 of the vehicle.

Figures 4, 5:
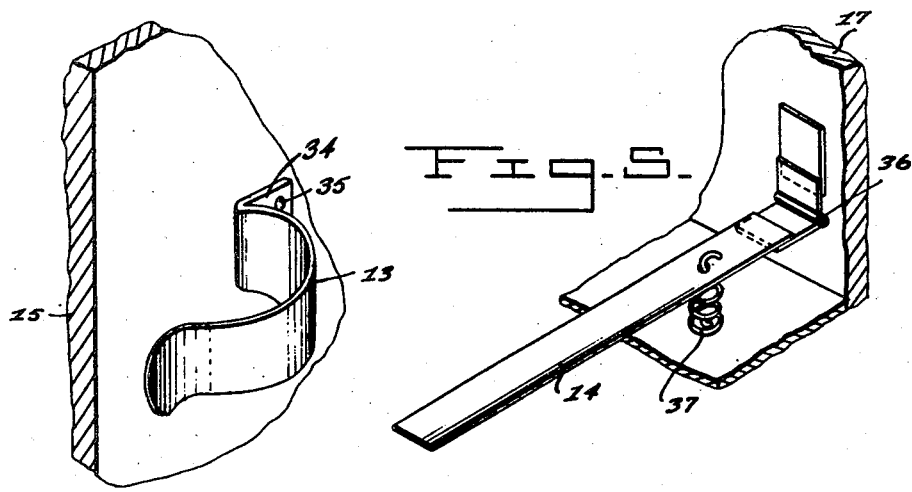
Figure 4 is a detail showing one of the bottle holding clips.
Figure 5 is a detail showing one of the clamps for holding products in various types of containers.

The spring clips 13 are formed and mounted as shown in Figure 4 with their open ends extending outward toward the front or open end of the casing so that the lower ends of bottles placed therein rest upon the floor of the ice box. The ends 34 of these clips may be spot welded or held by rivets or bolts 35 to the inner surfaces of the side walls of the casing. The clamps 14 may be attached to the walls of the casing through hinges 36 and resiliently held by springs 37, as shown, or by any suitable means.

The ice box or compartment may be permanently mounted in the refrigerator casing as shown in Figure 3 or may be removable as shown in Figure 1.

In operation, the refrigerator may be provided as illustrated and described and with the casing mounted in a trunk of a motor vehicle ice may be placed in the ice compartment 12, bottles may be inserted in the clips at the sides, and dishes, pans, or other containers with food or other products therein may be packed in the remaining area around and above the ice compartment, and these may be secured in place to prevent rattling and breaking by the spring clips and clamps.

It will be understood that as many clips and clamps as may be desired may be provided, and other changes may be made in the construction without departing from the spirit of the invention.

What is claimed is:

1. In a refrigerating element for motor vehicles and the like, the combination, which comprises, a box-like casing with insulated side, end, top, and bottom walls, an insulated door hinged to the front of the casing providing a substantially sealed closure therefor, a latch for securing the door in the closed position, an inner ice compartment in said casing with side and top walls spaced from corresponding walls of the casing, a drain extending from said ice compartment through the bottom of the casing, and adapted to extend through the floor of a motor vehicle in which the casing may be installed, spring clips adapted to hold bottles and the like on the inner walls of the casing, and spring product holding clamps in the casing in the area above the said ice compartment.

2. A refrigerating unit for motor vehicles and the like comprising a box-like casing with insulated walls, an ice compartment in said casing with perforated walls spaced from the walls of the casing, said ice compartment having a drain extending through the casing, a door sealing said ice compartment and casing, spring clips on the inner surfaces of the side walls of the casing, and spring clamps in the casing positioned above the said ice compartment and extending from the rear wall of the casing.

3. A portable refrigerator for motor vehicles and the like, comprising a box-like casing with insulated walls, an insulated door hinged to the casing, a latch for securing the door in sealed relation with the casing, an ice compartment in said casing with the walls thereof spaced from the side and top walls of the casing, said compartment being provided with a plurality of perforations for the circulation of cold air therethrough, a drain from said ice compartment through the lower surface of the casing, bottle holding clips on the inner surfaces of the side walls of the casing, and spring clamps in the upper part of the casing, said casing having holes in the lower surface thereof for the reception therethrough of fastening means for attachment to the floor of a motor vehicle.

FRANK W. MERSTICK.